(12) United States Patent
Xu et al.

(10) Patent No.: US 12,519,191 B2
(45) Date of Patent: Jan. 6, 2026

(54) BATTERY AND BATTERY MANUFACTURING METHOD

(71) Applicant: CALB Co., Ltd., Suzhou (CN)

(72) Inventors: Jiuling Xu, Changzhou (CN); Yongjie Zhang, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 579 days.

(21) Appl. No.: 17/975,602

(22) Filed: Oct. 28, 2022

(65) Prior Publication Data

US 2023/0420813 A1  Dec. 28, 2023

(30) Foreign Application Priority Data

Jun. 28, 2022 (CN) .......................... 202210784447.7

(51) Int. Cl.
*H01M 50/586* (2021.01)
*H01M 50/136* (2021.01)
(Continued)

(52) U.S. Cl.
CPC ....... *H01M 50/586* (2021.01); *H01M 50/136* (2021.01); *H01M 50/531* (2021.01);
(Continued)

(58) Field of Classification Search
CPC .. H01M 50/586; H01M 50/531; H01M 50/54; H01M 50/136; H01M 50/14;
(Continued)

(56) References Cited

U.S. PATENT DOCUMENTS

| 2009/0263712 A1* | 10/2009 | Mizuta | H01M 50/557 |
| | | | 429/177 |
| 2011/0076533 A1* | 3/2011 | Choi | H01M 10/0431 |
| | | | 429/185 |

(Continued)

FOREIGN PATENT DOCUMENTS

| CN | 213150885 | 5/2021 |
| CN | 113922008 | 1/2022 |

(Continued)

OTHER PUBLICATIONS

"Search Report of Europe Counterpart Application", issued on Aug. 16, 2023, p. 1-p. 8.

(Continued)

*Primary Examiner* — Jessie Walls-Murray
(74) *Attorney, Agent, or Firm* — JCIP GLOBAL INC.

(57) ABSTRACT

A battery and a battery manufacturing method are provided. The battery includes a battery casing, a cell, a first insulating film, and a second insulating film. The cell is disposed in the battery casing and includes a cell body and a tab portion, and the tab portion extends from a side surface of the cell body. The first insulating film covers at least a portion of the cell body. The second insulating film is independent from the first insulating film. The second insulating film covers an upper surface of the first insulating film and covers at least a portion of the tab portion, and the first insulating film is located between the cell body and the second insulating film.

11 Claims, 11 Drawing Sheets

(51) Int. Cl.
*H01M 50/531* (2021.01)
*H01M 50/54* (2021.01)
*H01M 50/548* (2021.01)
*H01M 50/593* (2021.01)
*H01M 50/595* (2021.01)

(52) U.S. Cl.
CPC ....... *H01M 50/548* (2021.01); *H01M 50/593* (2021.01); *H01M 50/595* (2021.01); *H01M 50/54* (2021.01)

(58) Field of Classification Search
CPC ............. H01M 50/105; H01M 50/593; H01M 50/595; H01M 50/548; H01M 50/129; H01M 50/562; H01M 50/178; H01M 50/103; H01M 50/186
See application file for complete search history.

(56) References Cited

U.S. PATENT DOCUMENTS

2017/0018753 A1   1/2017   Minagata et al.
2019/0214610 A1*  7/2019   Lee .................... H01M 50/198

FOREIGN PATENT DOCUMENTS

| CN | 217562786  | 10/2022 |
| EP | 2485298    | 8/2012  |
| JP | 2013161632 | 8/2013  |

OTHER PUBLICATIONS

"Office Action of China Counterpart Application", issued on Jul. 31, 2025, p. 1-p. 8.

* cited by examiner

BATTERY AND BATTERY MANUFACTURING METHOD

CROSS-REFERENCE TO RELATED APPLICATION

This application claims the priority benefits of China application serial no. 202210784447.7, filed on Jun. 28, 2022. The entirety of the above-mentioned patent application is hereby incorporated by reference herein and made a part of this specification.

BACKGROUND

Technical Field

The disclosure relates to the technical field of batteries, and in particular, relates to a battery and a battery manufacturing method.

Description of Related Art

In the related art, the cell of a battery is arranged inside the battery casing. However, due to the structural limitations of the cell and the tab portions, the cell and the battery casing are prone to the risk of insulation failure.

SUMMARY

The disclosure provides a battery and a battery manufacturing method.

According to a first aspect of the disclosure, a battery is provided, and the battery includes a battery casing, a cell, a first insulating film, and a second insulating film. The cell is disposed in the battery casing and includes a cell body and a tab portion. The tab portion extends from a side surface of the cell body. The first insulating film covers at least a portion of the cell body. The second insulating film is independent from the first insulating film. The second insulating film covers an upper surface of the first insulating film and covers at least a portion of the tab portion, and the first insulating film is located between the cell body and the second insulating film.

According to a second aspect of the disclosure, the disclosure further provides a battery manufacturing method, and the method includes the following steps. At least two single-piece tabs are welded to form a tab portion extending from a side surface of a cell body. At least a portion of the cell body is covered with a first insulating film. The tab portion is covered with a second insulating film, and the second insulating film is connected to the first insulating film.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
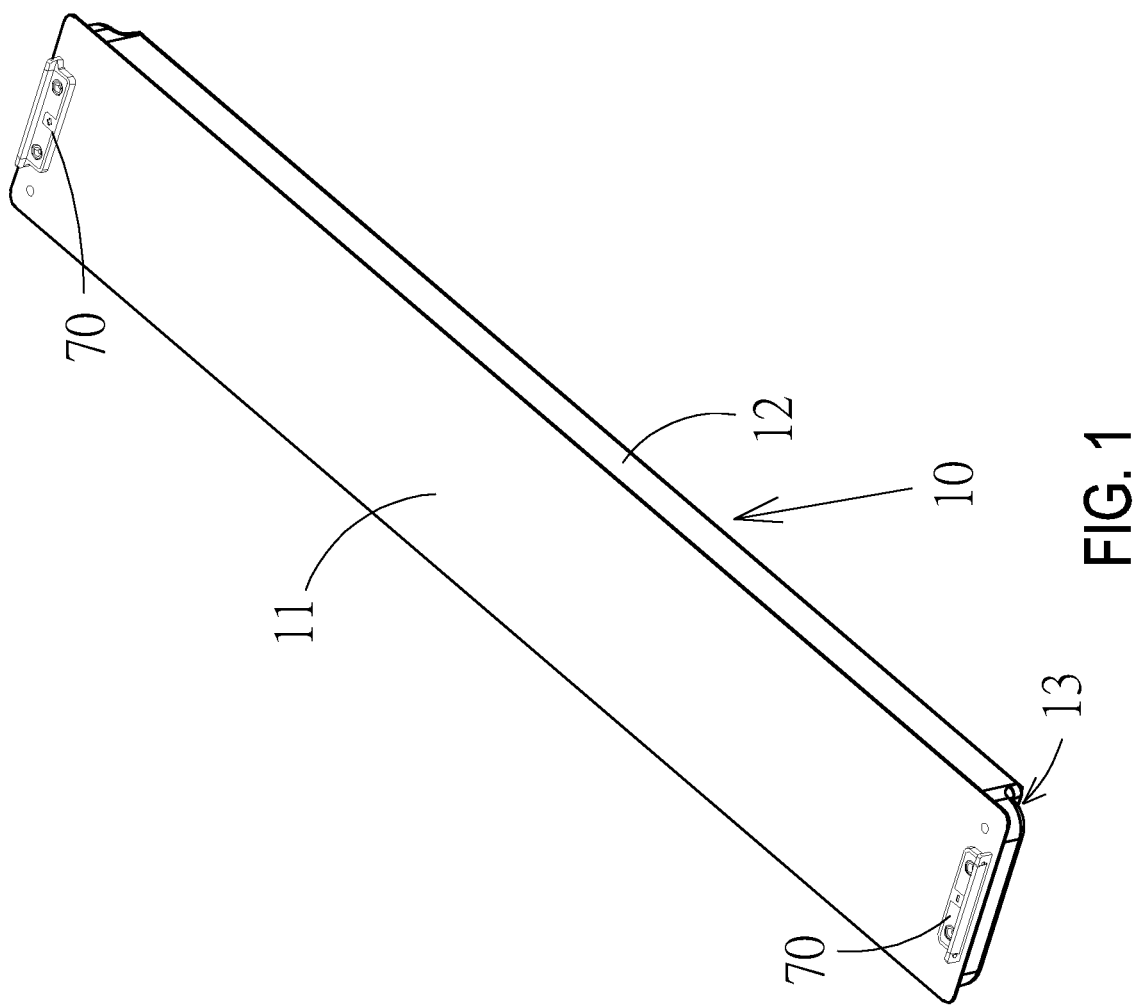
FIG. 1 is a schematic view illustrating a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. With reference to FIG. 1 to FIG. 10, the battery includes a battery casing 10, a cell 20, a first insulating film 30, and a second insulating film 40. The cell 20 is disposed in the battery casing 10, and the cell 20 includes a cell body 21 and tab portions 22 respectively extending from side surfaces of the cell body 21. The first insulating film 30 covers at least a portion of the cell body 21. The second insulating film 40 is independent from the first insulating film 30. The second insulating film 40 covers an upper surface of the first insulating film 30 and covers at least a portion of each of the tab portions 22, and the first insulating film 30 is located between the cell body 21 and the second insulating film 40.

The battery provided by an embodiment of the disclosure includes the battery casing 10, the cell 20, the first insulating film 30, and the second insulating film 40. The first insulating film 30 covers at least a portion of the cell body 21, and the second insulating film 40 is connected to the first insulating film 30 and covers the tab portions 22, such that the cell 20 and the battery casing 10 are insulated with the first insulating film 30 and the second insulating film 40. Since the second insulating film 40 is independent from the first insulating film 30, the first insulating film 30 and the second insulating film 40 may be conveniently installed, and the assembly efficiency of the battery is thereby improved. Further, by connecting the second insulating film 40 to the first insulating film 30, the installation stability of the first insulating film 30 and the second insulating film 40 may be ensured. Therefore, it is ensured that the first insulating film 30 and the second insulating film 40 realize reliable insulation of the cell 20 and the battery casing 10, and the safety performance of the battery is thereby improved.

It is noted that the first insulating film 30 covers at least a portion of the cell body 21, the second insulating film 40 covers the tab portions 22, and the second insulating film 40 is connected to the first insulating film 30. In this way, it is ensured that the first insulating film 30 and the second insulating film 40 are stably disposed, thereby ensuring that the first insulating film 30 realize reliable insulation of the cell body 21 and the battery casing 10, and the second insulating film 40 realize reliable insulation of the tab portions 22 and the battery casing 10.

The first insulating film 30 covers at least a portion of the cell body 21, and the second insulating film 40 covers the upper surface of the first insulating film 30. That is, the second insulating film 40 is located above the first insulating film 30. Therefore, the first insulating film 30 may be located between the cell body 21 and the second insulating film 40, so as to ensure that the first insulating film 30 reliably covers the cell body 21.

The tab portions 22 on the cell body 21 are generally required to be formed by folding and bending. By arranging the second insulating film 40 on the surfaces of the tab portions 22, the insulation between the tab portions 22 and the battery casing 10 may be ensured, and further, when each of the tab portions 22 is folded and bent, the tooling may bend the second insulating film 40 to drive each of the tab portions 22 to bend, which is convenient for constraining the tab portions 22 and preventing the tab portions 22 from warping and chipping when the tab portions 22 are folded. In this way, the assembly efficiency and yield of the battery may be improved, and the internal safety risk of the battery may be reduced.

By arranging the second insulating film 40 to be independent from the first insulating film 30, that is, the first insulating film 30 and the second insulating film 40 may be conveniently installed, installation positions of the first insulating film 30 and the second insulating film 40 may be effectively controlled since components with relatively small structures are easier to be installed after all. Moreover, the structures of the first insulating film 30 and the second insulating film 40 are easily wrinkled. Therefore, the above problem may be prevented from occurring by arranging the first insulating film 30 and the second insulating film 40 to be independently installed, the installation efficiency of the first insulating film 30 and the second insulating film 40 may thereby be improved, and the installation quality of the first insulating film 30 and the second insulating film 40 may also be ensured.

In an embodiment, the first insulating film 30 may be a Mylar film. The second insulating film 40 may include PET tape or PI tape or the like, for example, the second insulating film 40 may be blue PET tape.

In an embodiment, the second insulating film 40 is provided with an adhesive layer, and the second insulating film 40 is bonded to the first insulating film 30. Therefore, the second insulating film 40 may be reliably connected to the first insulating film 30, so as to secure the first insulating film 30 and to prevent the first insulating film 30 from cracking and causing the insulation failure of the cell body 21. The second insulating film 40 may be bonded to the tab portions 22 through the adhesive layer, and further, the second insulating film 40 may be bonded to the cell body 21 through the adhesive layer. The adhesive layer may be colloids in the related art, such as adhesives or structural adhesives and the like.

In an embodiment, the first insulating film 30 is not provided with an adhesive layer, that is, the first insulating film 30 may cover the cell body 21. Therefore, it is convenient for the first insulating film 30 to cover the cell body 21, and it can be ensured that the first insulating film 30 may cover the cell body 21 evenly and the wrinkling of the first insulating film 30 due to the adhesive layer may be prevented from occurring. Therefore, the evenness of the first insulating film 30 and the second insulating film 40 may be ensured when the first insulating film 30 is subsequently connected through the second insulating film 40, so the coating quality of the battery is improved, and the safety performance of the battery is ensured.

In an embodiment, the second insulating film 40 is partially adhered to the surface of the first insulating film 30 away from the cell body 21 and is partially adhered to the surface of the cell body 21 that is not covered by the first insulating film 30. That is, the second insulating film 40 is partially adhered onto the first insulating film 30, and the second insulating film 40 is partially adhered onto the cell body 21. In this way, the first insulating film 30 may be firmly secured on the cell body 21, and the relative displacement between the first insulating film 30 and the cell body 21 is prevented from occurring. Therefore, the cell body 21 is prevented from directly contacting the battery casing 10 after being exposed, and the second insulating film 40 may also realize insulation protection between the battery casing 10 and the cell body 21.

In an embodiment, the first insulating film 30 includes a first end 31 and a second end 32 opposite to each other, and the second insulating film 40 is connected to the first end 31 and the second end 32. Therefore, the connection between the first insulating film 30 and the second insulating film 40 can be implemented, and it can be ensured that the first insulating film 30 may stably cover the cell body 21.

The first end 31 and the second end 32 may be directly butted, and in some embodiments, it is not excluded that the first end 31 and the second end 32 are spaced apart. But the first insulating film 30 is formed with an overlapping portion, that is, one of the first end 31 and the second end 32 is covered by the first insulating film 30.

Figure 9:
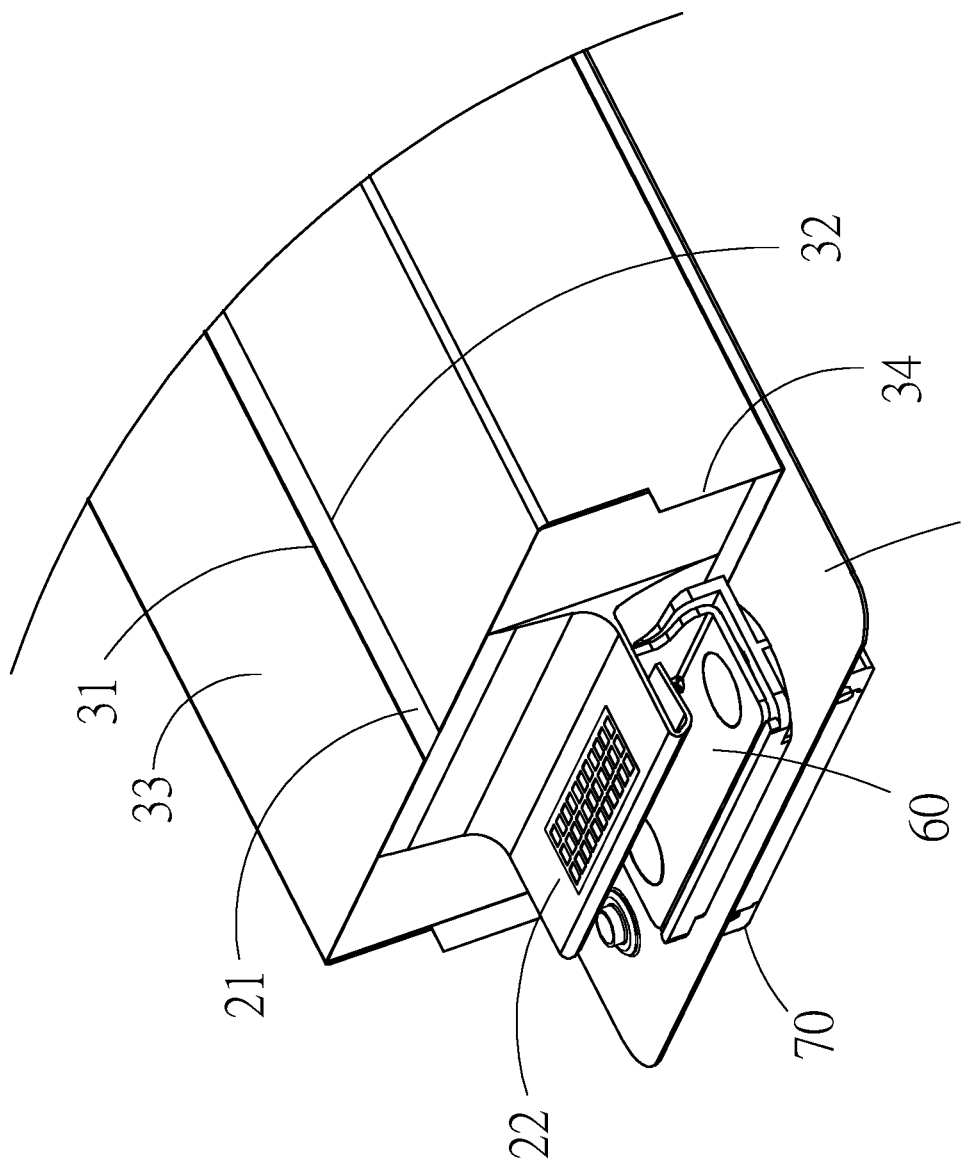
FIG. 9 is a partial schematic view illustrating a first insulating film and the cell of the battery according to an exemplary embodiment.

In an embodiment, as shown in FIG. 9, the first insulating film 30 includes the first end 31 and the second end 32 opposite to each other. A gap is formed between the first end 31 and the second end 32 to expose a portion of the cell body 21, and the second insulating film 40 is connected to the first end 31 and the second end 32 and covers the gap. Therefore, the second insulating film 40 may be partially adhered onto the first insulating film 30, and the second insulating film 40 may be partially adhered onto the cell body 21. The first insulating film 30 may thus be firmly secured on the cell body 21, and the relative displacement between the first insulating film 30 and the cell body 21 is prevented from occurring.

Figure 3:
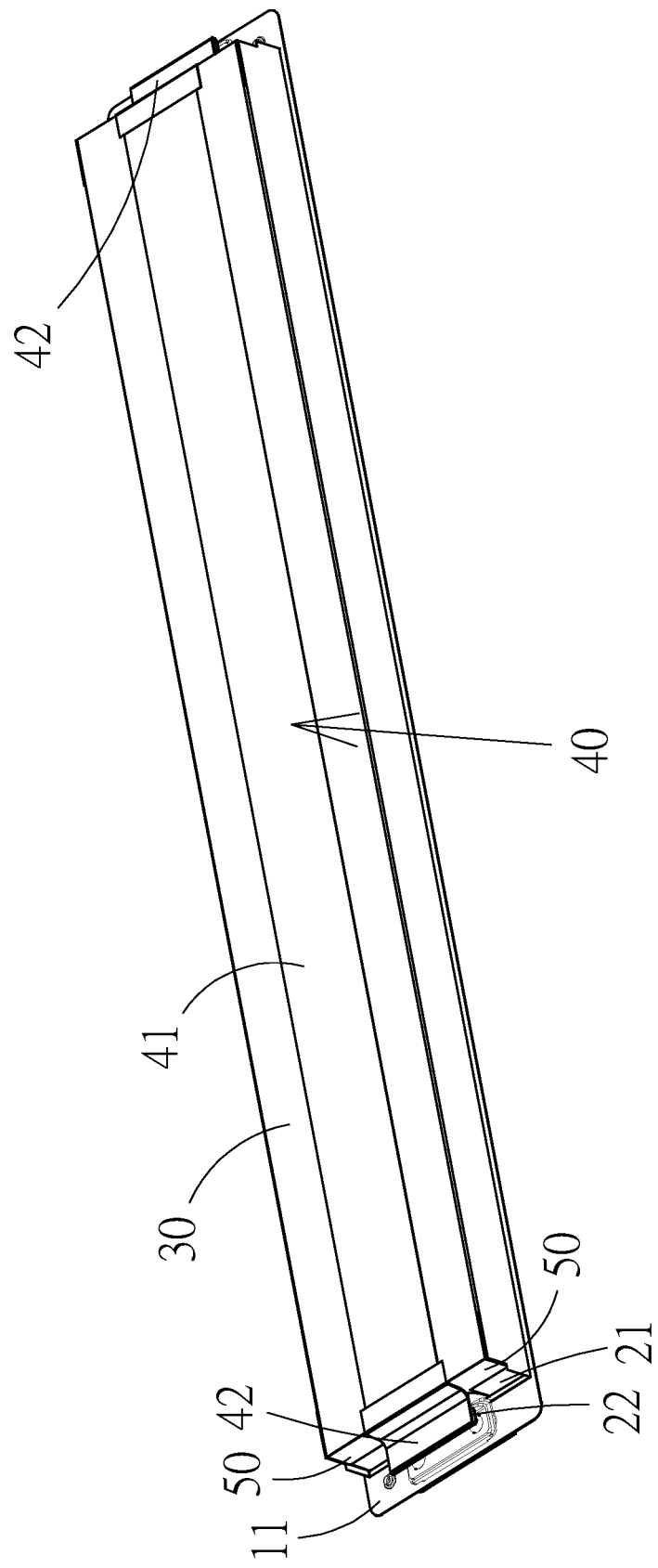
FIG. 3 is a schematic view illustrating an inner structure of the battery according to an exemplary embodiment.
Figure 10:
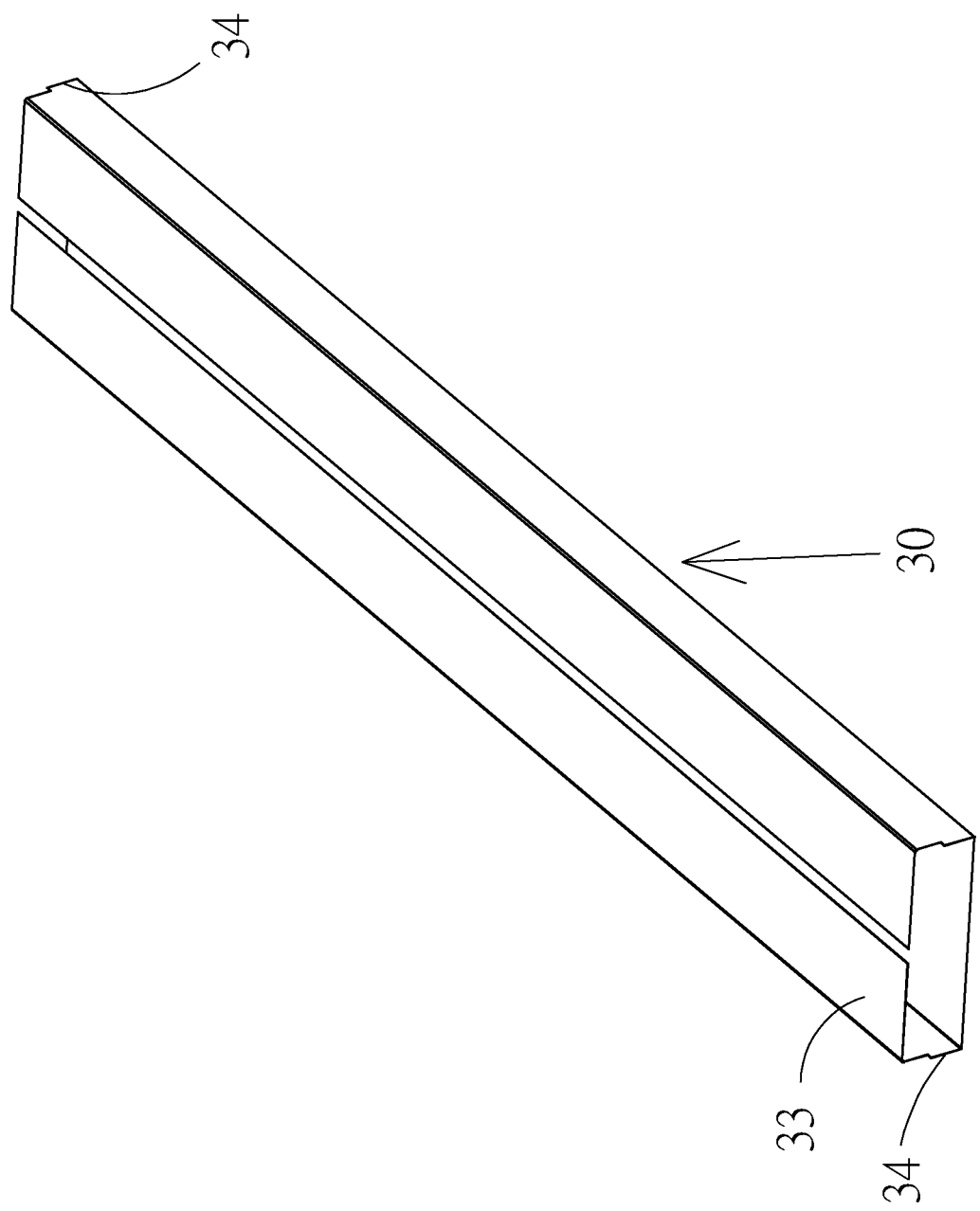
FIG. 10 is a schematic view illustrating the first insulating film of the battery according to an exemplary embodiment.

With reference to FIG. 3, the second insulating film 40 is connected to the first insulating film 30. Both ends of the second insulating film 40 may respectively extend to the two tab portions 22 so as to cover the tab portions 22. In an embodiment, as shown in FIG. 9 and FIG. 10, the first insulating film 30 includes a body portion 33 and two extension portions 34. The body portion 33 covers a portion of the cell body 21, and the extension portions 34 respectively extend from the two ends of the body portion 33 in a first direction to extend beyond the cell body 21. Therefore, each of the extension portions 34 may be used for insulation and protection between a respective one of the tab portions 22 and the battery casing 10, and the safety performance of the battery is thereby improved. The second insulating film 40 is connected onto the body portion 33.

In an embodiment, each extension portion 34 extends from a portion of the end of the body portion 33, so that the width of the extension portion 34 is less than the width of the body portion 33. That is, in the circumferential direction of the body portion 33, a gap is provided between the two ends of each extension portion 34, so the size of each extension portion 34 may be reduced, but the insulation and protection of each of the extension portions 34 to a respective one of the tab portions 22 and the battery casing 10 are not affected.

With reference to FIG. 9 and FIG. 10 together, each extension portion 34 generally forms a U-shaped structure, and each extension portion 34 can achieve insulation and protection between the respective tab portion 22 and the battery casing 10.

The width of the body portion 33 refers to the size of one end of the body portion 33, and correspondingly, the width of each extension portion 34 refers to the length of the extension portion 34 connected to the end of the body portion 33.

In some embodiments, it is not excluded that each extension portion 34 extends from the entire end portion of the body portion 33, so that the width of the extension portion 34 is equal to the width of the body portion 33.

In an embodiment, as shown in FIG. 3 to FIG. 7, the second insulating film 40 includes a first segment 41 and two second segments 42, the first segment 41 is connected to the first end 31 and the second end 32, and the second segments 42 are connected to the first segment 41 and respectively covers the tab portions 22. Therefore, the first segment 41 may be partially adhered onto the first insulating film 30, and the first segment 41 may be partially adhered onto the cell body 21. In this way, the first insulating film 30 may be firmly secured on the cell body 21, and the relative displacement between the first insulating film 30 and the cell body 21 is prevented from occurring. Therefore, the cell body 21 is prevented from directly contacting the battery casing 10 after being exposed, and each of the second segments 42 can achieve insulation protection between the respective one of the tab portions 22 and the battery casing 10.

It is noted that the first segment 41 covers the cell body 21, the second segments 42 respectively covers the tab portions 22, and the second segments 42 are connected to the first segment 41. In this way, it is ensured that the first segment 41 and the second segments 42 are stably disposed, thereby ensuring that the first segment 41 realizes reliable insulation of the cell body 21 and the battery casing 10, and each of the second segments 42 realizes reliable insulation of the respective one of the tab portions 22 and the battery casing 10.

The tab portions 22 on the cell body 21 are generally required to be formed by folding and bending. By arranging the second segment 42 on the surface of the tab portion 22, the insulation between the tab portion 22 and the battery casing 10 may be ensured, and further, when the tab portion 22 is folded and bent, the tooling may bend the second segment 42 to drive the tab portion 22 to bend, which is convenient for constraining the tab portion 22 and preventing the tab portion 22 from warping and chipping when the tab portion 22 is folded. In this way, the assembly efficiency and yield of the battery may be improved, and the internal safety risk of the battery may be reduced.

Figure 5:
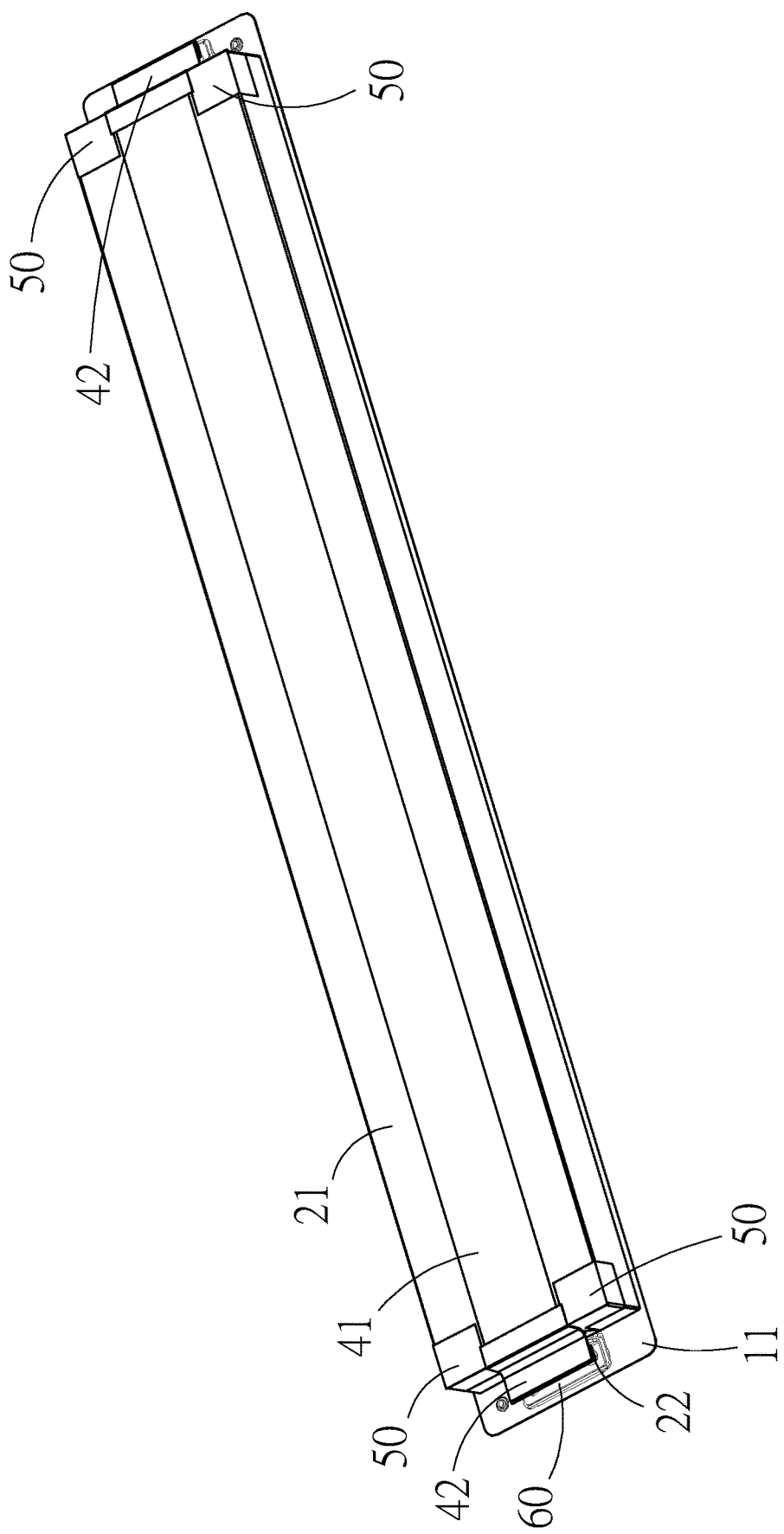
FIG. 5 is a schematic view illustrating a portion of the battery according to an exemplary embodiment.
Figure 6:
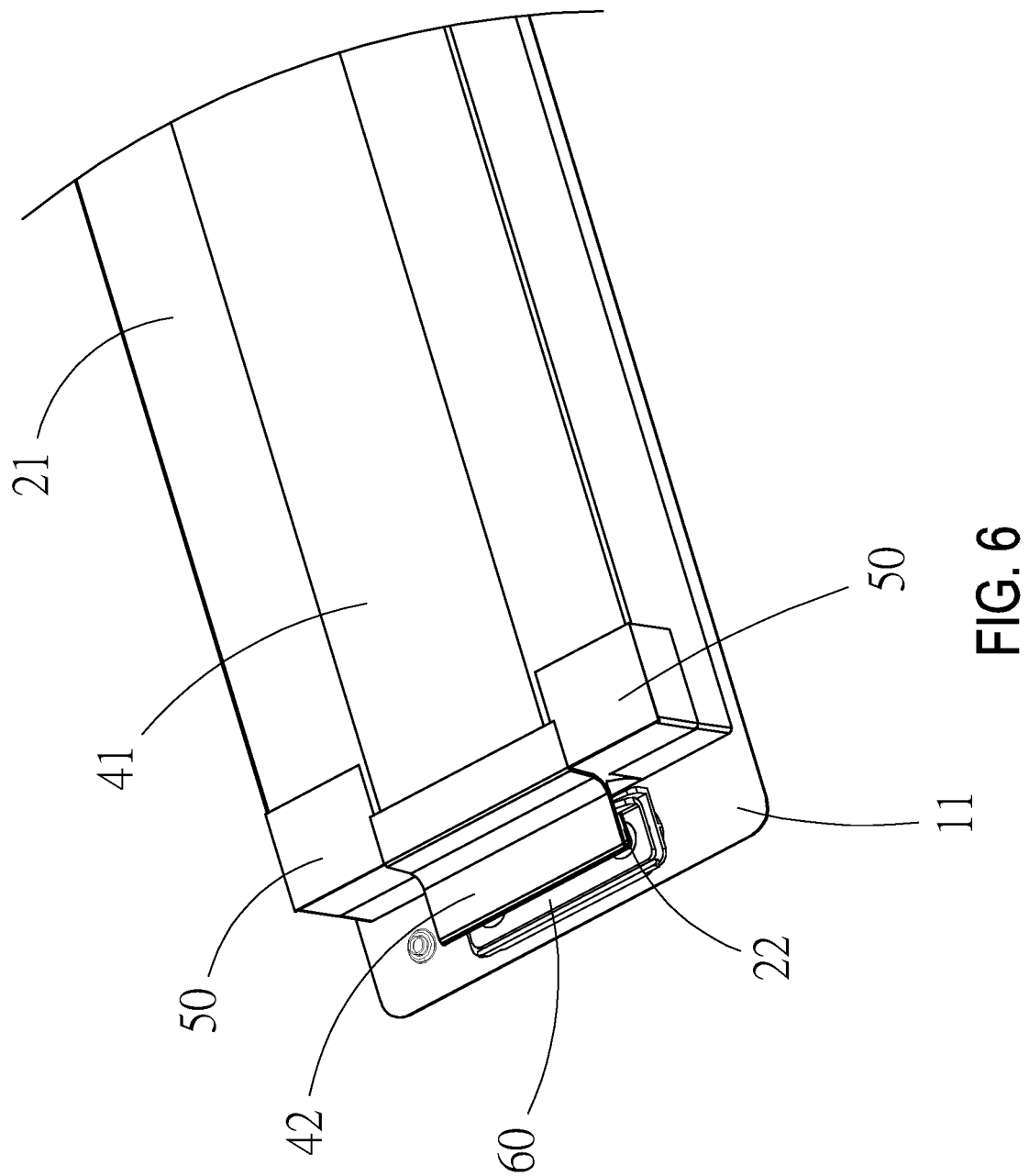
FIG. 6 is a partial enlarged view illustrating the battery according to an exemplary embodiment.

The cell 20 includes the cell body 21 and two tab portions 22. The two tab portions 22 may be respectively located on two opposite sides of the cell body 21, one of the tab portions 22 may extend from one side surface of the cell body 21 in the first direction, and the other one of the tab portions 22 may extend from other side surface of the cell body 21 in a second direction. The first direction and the second direction are opposite to each other. Two second segments 42 may be provided, and the two second segments 42 respectively cover the two tab portions 22, as shown in FIG. 3 and FIG. 5.

In an embodiment, the first segment 41 may be PET tape or PI tape or the like, for example, the first segment 41 may be blue PET tape. The second segments 42 may be PET tape or PI tape or the like, for example, the second segments 42 may be blue PET tape.

In an embodiment, in a width direction of the cell body 21, the width of each second segment 42 is greater than the width of the first segment 41, and the second segment 42 is connected to the first segment 41, so that the first segment 41 may reliably cover the cell body 21. In this way, it is ensured that the first segment 41 and the second segments 42 reliably insulate the cell 20 and the battery casing 10, and the safety performance of the battery is thereby improved.

In an embodiment, in the width direction of the cell body 21, the width of each second segment 42 is greater than the width of each tab portion 22, so as to prevent the two ends of the tab portion 22 from extending beyond the two ends of the second segment 42 in the width direction of the cell body 21. That is, it is ensured that the two ends of the tab portion 22 do not extend beyond the two ends of the second segment 42, so that the second segment 42 may reliably cover the tab portion 22. Therefore, it is ensured that an insulating arrangement is formed between the tab portions 22 and the battery casing 10, and the safety performance of the battery is thereby improved. The width direction of the cell body 21 is parallel to the width direction of the tab portion 22, and the width direction of the tab portion 22 is perpendicular to the direction in which the tab portion 22 are drawn out from the side of the cell body 21.

In an embodiment, in a length direction of the cell body 21, the first segment 41 extends from one end of the first insulating film 30 to another end of the first insulating film 30, so that the first segment 41 may reliably cover the first insulating film 30. In this way, the first insulating film 30 may reliably protect the cell body 21, and the effective insulation between the battery casing 10 and the cell body 21 is thus ensured.

In an embodiment, the width of the second insulating film 40 is greater than the width of each tab portion 22, and the width of the second insulating film 40 is less than the width of the cell body 21. When it is ensured that the second insulating film 40 may reliably cover the tab portions 22, the problem of inconvenient installation of the second insulating film 40 due to an excessively large width may be prevented from occurring.

In the direction perpendicular to the direction in which each tab portion 22 is drawn out from the respective side of the cell body 21, the size of each tab portion 22 is the width of the tab portion 22.

The width of each second segment 42 of the second insulating film 40 may be greater than the width of each tab portion 22, and the width of each second segment 42 of the second insulating film 40 may be less than the width of the cell body 21. The width of the first segment 41 may be less than the width of the cell body 21, and the width of the first segment 41 may be greater than the width of each second segment 42, or the width of the first segment 41 may be less than the width of each second segment 42.

In an embodiment, two tab portions 22 are provided, and the two tab portions 22 respectively extend from two opposite sides of the cell body 21. The second insulating film 40 extends from one of the tab portions 22 to the other one of the tab portions 22. Therefore, the assembly efficiency of the second insulating film 40 may be improved, the second insulating film 40 may reliably secure the first insulating film 30, and furthermore, the second insulating film 40 may form reliable insulation protection for the two tab portions 22.

It should be noted that the tab portions 22 may be configured to be connected to terminal components. The tab portions 22 are generally exposed structures, and if no other insulating structure is provided between each of the tab portions 22 and the battery casing 10, a risk of electrical connection may occur between each of the tab portions 22 and the battery casing 10. In this embodiment, by arranging the second segments 42 to respectively cover the tab portions 22 and ensuring that the two ends of each of the tab portions 22 do not extend beyond the two ends of the respective second segment 42, the insulation between each of the tab portions 22 and the battery casing 10 may be ensured with the arrangement of the second segment 42.

In an embodiment, each tab portion 22 includes two or more single-piece tabs extending from the side surface of the cell body 21, and the plurality of single-piece tabs are gathered to form the tab portion 22, so as to form a first bending region 221 on the side of the tab portion 22 adjacent to the cell body 21. Herein, the second segment 42 covers the first bending region 221, so as to ensure the insulating arrangement between the tab portion 22 and the battery casing 10. Further, tooling may perform on the second segment 42 to bend the plurality of single-piece tabs, so as to prevent warping and chipping when the single-piece tabs are folded. In this way, the assembly efficiency and yield of the battery may be improved, and the internal safety risk of the battery may be reduced.

Figure 7:
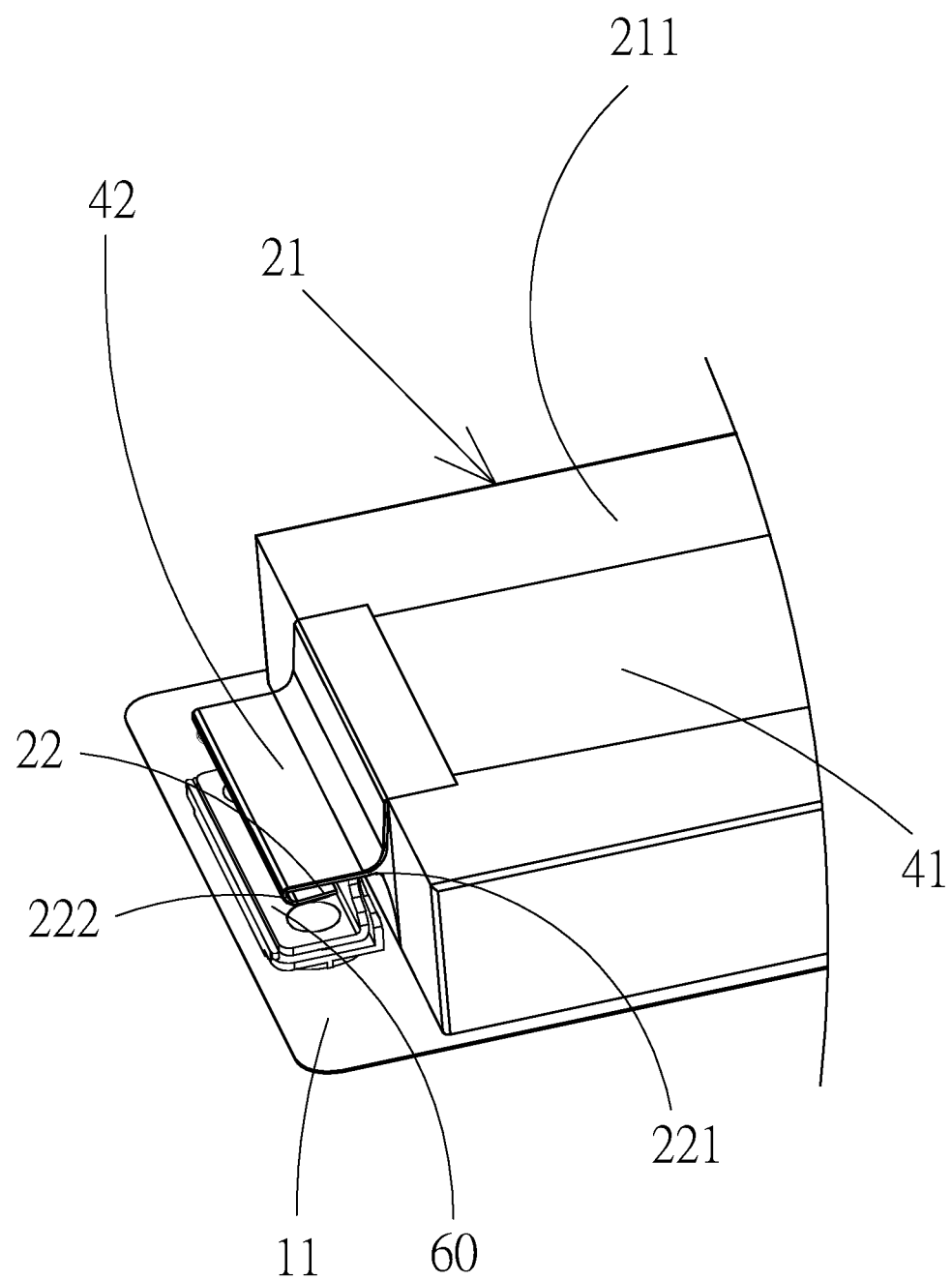
FIG. 7 is a partial schematic view illustrating the battery according to an exemplary embodiment.
Figure 8:
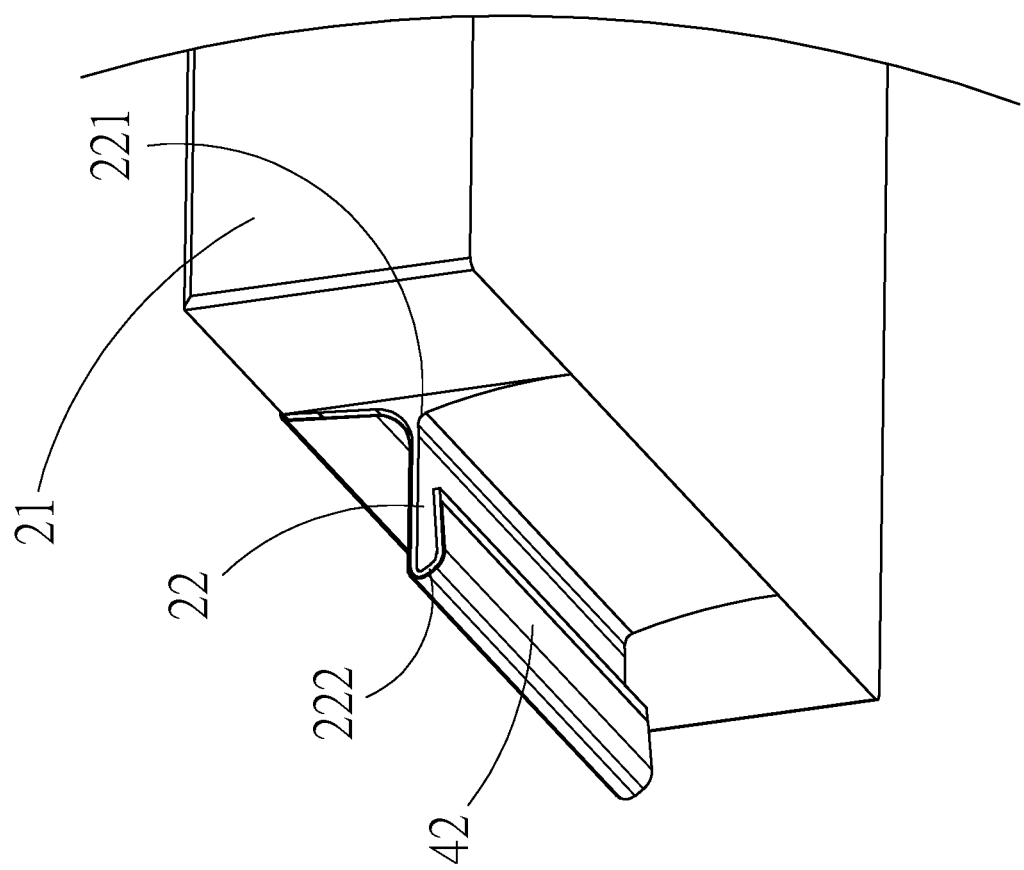
FIG. 8 is a partial schematic view illustrating a second segment and a cell of the battery according to an exemplary embodiment.

The top of the single-piece tabs may be covered by the second segment 42, and when the single-piece tabs are folded and bent, the tooling may bend the second segment 42 to drive the single-piece tabs to bend, such that it is thus convenient to constrain the single-piece tabs, so as to prevent the single-piece tabs from occurring warping and chipping when being folded. In this way, the assembly efficiency and yield of the battery may be improved, and the internal safety risk of the battery may be reduced. The first bending region 221 as shown in FIG. 7 and FIG. 8 may be formed when the single-piece tabs are folded and bent.

It is noted that the cell body 21 includes two or more electrode pieces, each tab portion 22 includes two or more single-piece tabs, and the single-piece tabs extend from the corresponding electrode pieces. The width of each single-piece tab may be less than the width of each electrode piece, and a plurality of single-piece tabs are stacked to form the tab portion 22. The single-piece tabs are made of metal foils with good electrical and thermal conductivity, such as aluminum, copper, or nickel.

In an embodiment, in the width direction of the cell body 21, the length of the second segment 42 extending beyond the tab portion 22 is 1 mm to 10 mm. In this way, the reliable coverage of the second segment 42 to the tab portion 22 may be ensured, and problems such as installation inconvenience caused by the second segment 42 being excessively long may be prevented from occurring.

In the width direction of the cell body 21, the length of the second segment 42 extending beyond the tab portion 22 may be 1 mm, 1.1 mm, 1.2 mm, 1.5 mm, 2 mm, 2.5 mm, 3 mm, 3.5 mm, 4 mm, 4.5 mm, 4.8 mm, 4.9 mm, 5 mm, 5.5 mm, 6 mm, 6.5 mm, 7 mm, 7.5 mm, 8 mm, 8.5 mm, 9 mm, 9.5 mm, 9.8 mm, 9.9 mm, or 10 mm and so on.

It should be noted that, in the width direction of the cell body 21, both ends of the second segment 42 may extend beyond the tab portion 22. Alternatively, in the width direction of the cell body 21, one end of the second segment 42 may extend beyond the tab portion 22, and the other end may be flush with the tab portion 22.

In an embodiment, as shown in FIG. 7 and FIG. 8, the tab portion 22 is formed with a second bending region 222, and the second bending region 222 is located on the side of the first bending region 221 away from the cell body 21. The first bending region 221 and the second bending region 222 are spaced apart from each other. The formation of the second bending region 222 may reduce the length of the tab portion 22 in the length direction of the cell body 21, so that the space occupied by the tab portion 22 in the length direction is reduced. In this way, the internal space of the battery casing 10 may be saved, and the ends of the tab portion 22 may be prevented from being electrically connected to the battery casing 10.

In an embodiment, as shown in FIG. 7 and FIG. 8, the second segment 42 covers the second bending region 222, so that through the second segment, it is ensured that the second bending region 222 is not electrically connected to the battery casing 10.

Considering that the second bending region 222 may be located at the farthest end in the length direction of the cell, the possibility of the second bending region 222 being in contact with the battery casing 10 increases. By making the second segment 42 further cover the second bending region 222, reliable insulation between the second bending region 222 and the battery casing 10 is ensured through the second segment 42.

In an embodiment, one end of the second segment 42 away from the cell body 21 extends between the second bending region 222 and an end of the tab portion 22 away from the cell body 21. In this way, it can be ensured that the second segment 42 may reliably cover the second bending region 222, and the problems of inconvenient installation and increased costs due to the excessive length of the second segment 42 may also be prevented.

In an embodiment, the end of the second segment 42 away from the cell body 21 does not exceed beyond the end of the tab portion 22 away from the cell body 21. That is, the length of the second segment 42 covering the tab portion 22 may be less than the length of the tab portion 22. Therefore, the second segment 42 may be conveniently arranged, and the reliable insulation between the tab portion 22 and the battery casing 10 by the second segment 42 may also be ensured.

In an embodiment, as shown in FIG. 7, the battery further includes a connecting sheet 60, the connecting sheet 60 is disposed on the battery casing 10, and the tab portion 22 covers a portion of the connecting sheet 60. The tab portion 22 is bent from one end of the connecting sheet 60 to form the second bending region 222, so as to ensure that the tab portion 22 may reliably cover a portion of the connecting sheet 60. Further, the contact area between the tab portion 22 and the connecting sheet 60 may be increased, so the overcurrent capability of the tab portion 22 and the connecting piece 60 may be improved.

In an embodiment, the second segment 42 covers the side of the tab portion 22 facing away from the connecting sheet 60. Therefore, it is ensured that the second segment 42 may cover the tab portion 22, the formation of the insulation of the tab portion 22 is ensured, and the bending of the tab portion 22 and the generation of metal chips that affect the overall safety of the battery may also be avoided.

With reference to FIG. 7, after the tab portion 22 extends from the side surface of the cell body 21, the tab portion 22 may be bent at one end of the connecting sheet 60, so that the tab portion 22 covers the connecting sheet 60. That is, a portion of the tab portion 22 is located at an inner side of the connecting sheet 60. Herein, the second segment 42 may cover at least a portion of the tab portion 22 located below the connecting sheet 60, so as to prevent the tab portion 22 from being bent to generate metal chips, and the insulation performance of the second segment 42 is thereby improved.

In an embodiment, as shown in FIG. 7, the second segment 42 is connected to the cell body 21, and in this way, the connection stability of the second segment 42 may be ensured, and the second segment 42 may form insulation protection for the cell body 21.

Figure 2:
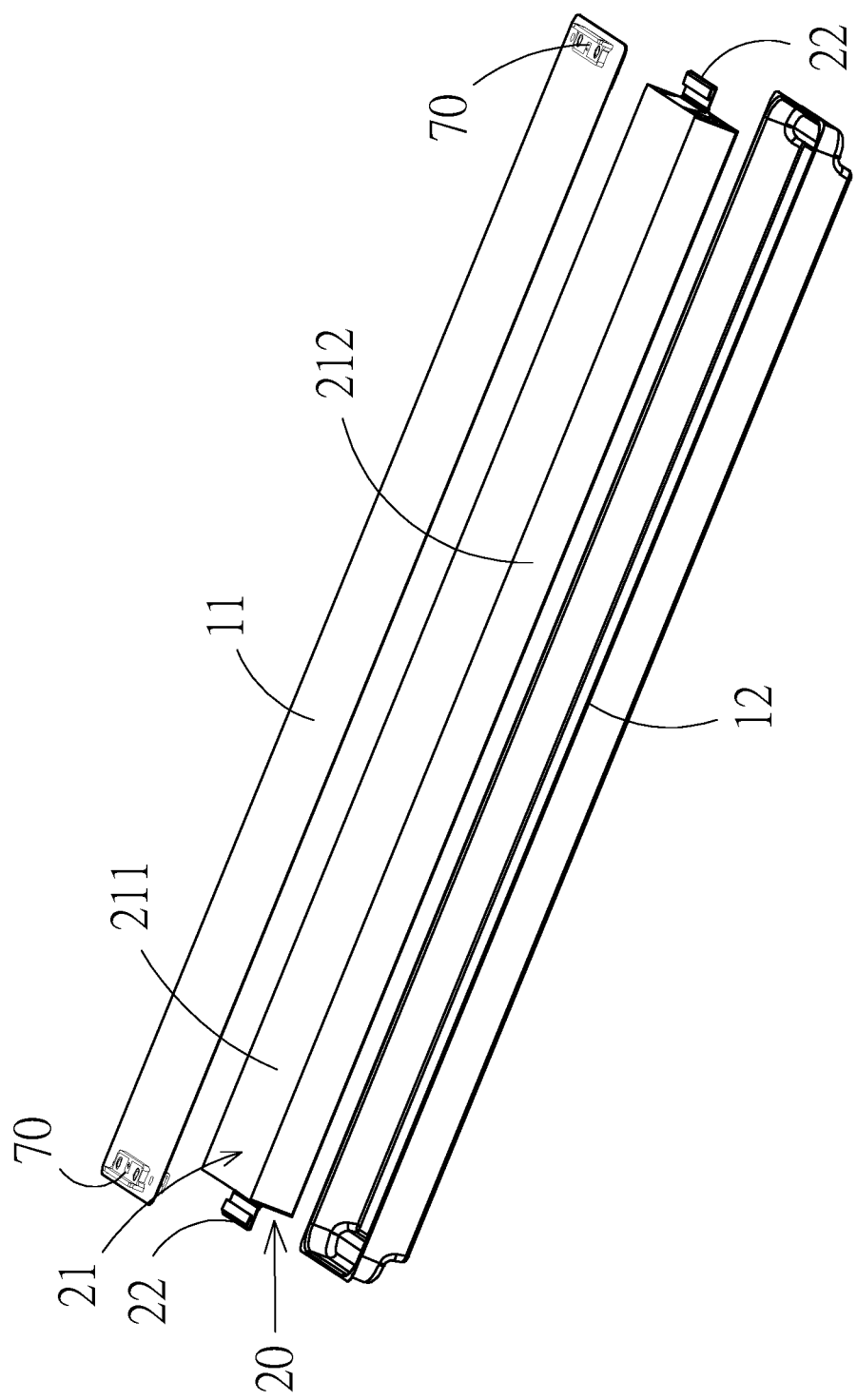
FIG. 2 is a schematic exploded view illustrating a portion of the battery according to an exemplary embodiment.

In an embodiment, as shown in FIG. 2, the cell body 21 includes two first surfaces 211 opposite to each other and four second surfaces 212 surrounding the first surfaces 211, and an area of each first surface 211 is greater than an area of each second surface 212. The second segments 42 are connected to the first surface 211, and the second segments 42 respectively cover the larger surfaces of the tab portions 22, so that the second segments 42 may respectively and reliably protect the tab portions 22 and provide reliable insulation protection.

It should be noted that the two opposite first surfaces 211 are larger surfaces of the cell body 21, and the four second surfaces 212 are smaller surfaces of the cell body 21. The four second surfaces 212 include two pairs of smaller surfaces, namely, a first pair of smaller surfaces extending in the length direction of the cell body 21 and a second pair of smaller surfaces extending in the width direction of the cell body 21. The area of the first pair of smaller surfaces is greater than that of the second pair of smaller surfaces, but are both smaller than the area of each of the larger surfaces. The two tab portions 22 may respectively extend from the second pair of smaller surfaces.

Correspondingly, the battery casing 10 may also include two larger surfaces and four smaller surfaces. The two larger surfaces of the battery casing 10 are opposite to the two larger surfaces of the cell body 21, and the four smaller surfaces of the battery casing 10 are opposite to the four smaller surfaces of the cell body 21.

After the single-piece tabs of each of the tab portions 22 are leveled, the single-piece tabs are parallel to the first surfaces 211, and the second segment 42 covers the tab portion 22, so that the second segment 42 may effectively realize insulation protection between the tab portion 22 and the battery casing 10.

In an embodiment, the second segments 42 are independent from the first segment 41, and the second segments 42 are connected to the upper surface of the first segment 41. In the width direction of the cell body 21, the width of each second segment 42 is 5 mm to 20 mm longer than the width of the first segment 41, so that in the width direction of the cell body 21, the two ends of the first segment 41 are prevented from exceeding beyond the two ends of the second segments 42. Therefore, the second segments 42 may be reliably pressed to the first segment 41, and the connection stability of the first segment 41 may thus be ensured. Further, the length of each second segment 42 may not be excessively long, so the costs may be prevented from increasing.

In the width direction of the cell body 21, the width of each second segment 42 is 5 mm, 6 mm, 7 mm, 10 mm, 12 mm, 15 mm, 16 mm, 18 mm, 19 mm, or 20 mm longer than the width of the first segment 41.

In an embodiment, the second segments 42 and the first segment 41 are integrally formed, so that the second insulating film 40 may cover both the tab portions 22 and the first insulating film 30, thereby improving the installation efficiency of the second insulating film 40.

In an embodiment, the second segments 42 are independent from the first segment 41, and the second segments 42 cover portions of the first segment 41, so that the second segments 42 and the first segment 41 are connected. In addition, the second segments 42 and the first segment 41 may be installed independently, so that the installation accuracy of the second segments 42 and the first segment 41 is improved.

In an embodiment, the second segments 42 also cover surfaces of the cell body 21 that are not covered by the first insulating film 30 and the first segment 41, so that the second segments 42 may be connected to the first insulating film 30, the cell body 21, as well as the tab portions 22. In this way, the connection stability of the second segments 42 is ensured, and the insulation and protection range of the second segments 42 may be improved.

In an embodiment, as shown in FIG. 2, the cell body 21 includes two first surfaces 211 opposite to each other and four second surfaces 212 surrounding the first surfaces 211, and the area of each first surface 211 is greater than the area of each second surface 212. Herein, the first insulating film 30, the first segment 41, and the second segments 42 cover the same first surface 211. The first end 31 and the second end 32 of the first insulating film 30 are located on the first surface 211. In order to ensure that the first segment 41 may be connected to the first end 31 and the second end 32 and the first segment 41 covers the surface of the cell body 21, the gap between the first end 31 and the second end 32 may be relatively large. Therefore, the connection stability of the first segment 41 is ensured, it can be ensured that the second segment 42 may cover the larger surface of the tab portion 22, and the second segment 42 may achieve reliable insulation and protection between the tab portion 22 and the battery casing 10.

In an embodiment, the first segment 41 covers a portion of one first surface 211. The area of the first segment 41 covering the first surface 211 is not greater than half of the area of the first surface 211. In this way, it is ensured that the first segment 41 may secure the first insulating film 30, and an increase in costs caused by an excessively large first segment 41 may also be prevented from occurring. In addition, the first segment 41 may also be conveniently arranged, so that the installation efficiency is improved.

Figure 4:
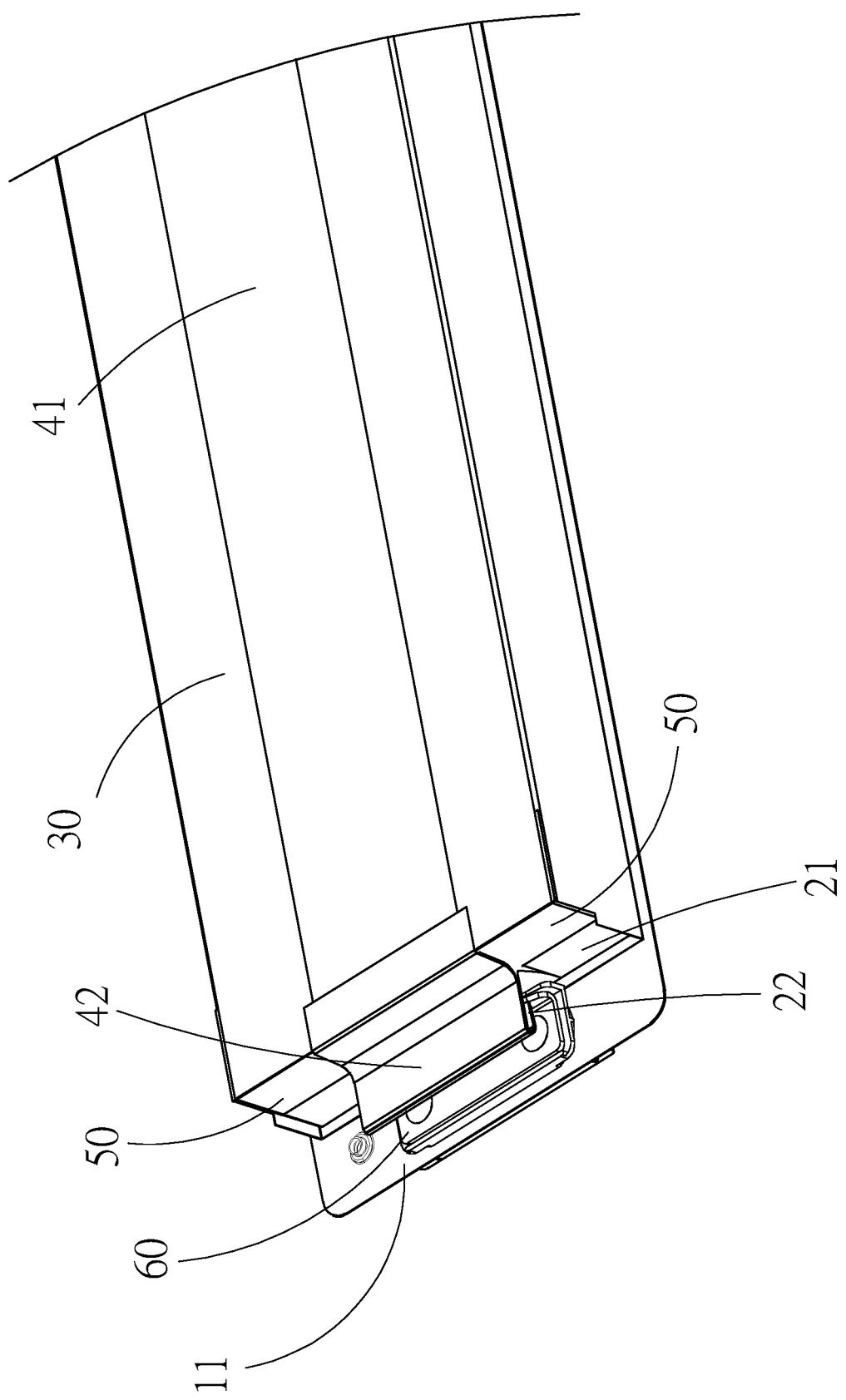
FIG. 4 is a partial enlarged view illustrating the inner structure of the battery according to an exemplary embodiment.

In an embodiment, as shown in FIG. 3 to FIG. 5, the battery further includes four third insulating films 50, and each third insulating film 50 covers one of the first surfaces 211 and adjacent two of the second surfaces 212. That is, the third insulating films 50 may respectively cover the corner regions of the cell body 21, that is, the corners of the cell body 21. Therefore, the protection of the corners of the cell body 21 by the third insulating films 50 is ensured, and the insulation performance of the cell body 21 and the battery casing 10 is thereby improved.

In an embodiment, as shown in FIG. 3 and FIG. 4, the first insulating film 30 covers portions of the third insulating films 50, and the second insulating film 40 is adhered to the surface of the first insulating film 30 covering the first surface 211. Therefore, the first insulating film 30 may secure the third insulating films 50, so as to ensure that the third insulating films 50 may respectively and reliably protect the corners of the cell body 21. The third insulating films 50 may be PET tape or PI tape or the like, for example, the third insulating films 50 may be blue PET tape.

In an embodiment, as shown in FIG. 1 and FIG. 2, the battery further includes terminal components 70. Each terminal component 70 is connected to a respectively one of the connecting sheets 60, and a portion of the terminal component 70 is located outside the battery casing 10. The terminal components 70 are disposed on the larger surface of the battery casing 10, so that the larger surface of the battery casing 10 may provide sufficient supporting force for the terminal components 70, and the stability of the terminal components 70 is thereby ensured. The terminal components 70 are respectively connected to the connecting sheets 60, and the connecting sheets 60 are respectively connected to the tab portions 22, so that the terminal components 70 may act as the electrode lead-out ends of the battery. The terminal component 70 and the connecting sheet 60 may be welded, or the terminal component 70 and the connecting sheet 60 may be riveted.

In some embodiments, two terminal components 70 are provided, and the two terminal components 70 are a positive terminal component and a negative terminal component. Each terminal component 70 may include two terminals for enhancing the overcurrent capability of the battery. There are also two tab portions 22, and the two tab portions 22 are respectively a positive tab and a negative tab. The positive terminal component is connected to the positive tab, and the negative terminal component is connected to the negative tab.

It should be noted that the terminal components 70 and the battery casing 20 may be insulated from each other. For instance, an insulating piece may be used for insulation between each terminal component 70 and the battery casing 20, or an insulating coating may be applied for insulation, which is not particularly limited herein, and selection may be made according to actual needs.

In an embodiment, the battery casing 10 is provided with recesses 13, and the terminal components 70 are respectively located in the recesses 13, so that the terminal components 70 may be prevented from occupying the stacking space of a battery apparatus, thereby improving the energy density of the battery apparatus.

In an embodiment, as shown in FIG. 1, the battery casing 10 is provided with the recesses 13, the terminal components 70 and the recesses 13 are respectively located on two opposite surfaces of the battery casing 10, and the recesses 13 are configured to accommodate terminal components of another battery. In this way, when the batteries are grouped, the terminal components of another battery may be respectively accommodated in the recesses 13, the terminal components are thus prevented from occupying the space between the two batteries, the distance between the two adjacent batteries is reduced, and the energy density of the battery apparatus is thereby improved.

In an embodiment, as shown in FIG. 1 and FIG. 2, two terminal components 70 and two recesses 13 may be provided. The two terminal components 70 may be disposed on the same larger surface of the battery casing 10, and the two recesses 13 may be disposed on the other larger surface of the battery casing 10.

In an embodiment, as shown in FIG. 2, the battery casing 10 includes a first casing piece 11 and a second casing piece 12, and the second casing piece 12 is connected to the first casing piece 11 to seal the cell 20. Herein, the first casing piece 11 is a flat plate.

In an embodiment, the terminal components 70 may be disposed on the first casing piece 10, and the first casing piece 11 is a flat plate. It thus can be seen that the first casing piece 25 has a simple structure, the terminal components 70 may be conveniently arranged, so that the molding efficiency of the battery is increased.

In an embodiment, the material of the battery casing 10 may be stainless steel or aluminum featuring good corrosion resistance and sufficient strength. The battery casing 10 has a substantially rectangular shape.

It should be noted that, the first casing piece 11 and the second casing piece 12 may be independently arranged, as shown in FIG. 2. In some embodiments, it is not excluded that the first casing piece 11 and the second casing piece 12 may be an integral structure, and the space for accommodating the cell 20 is formed by stamping, and then welding is used for subsequent sealing and connection.

In an embodiment, the battery has a length a, where 400 mm≤L≤2800 mm is satisfied, and the battery has a width b and a height c, where b≤a≤80b and/or 0.5c≤b≤20c are satisfied.

Further, 80 mm≤b≤200 mm and 10 mm≤c≤100 mm are satisfied.

Preferably, 4b≤a≤25b and/or 2c≤b≤10c are satisfied.

Regarding the battery provided in the foregoing embodiments, in the case where sufficient energy density is ensured, the ratio of the length to the width of the battery is larger, and further, the ratio of the width to the height of the battery is larger.

In an embodiment, the length of the battery is a, and the width of the battery is b, where 4b≤a≤7b is satisfied. That is, the ratio of the length to the width of the battery in this embodiment is larger, and in this way, the energy density of the battery is increased, and subsequent formation of the battery apparatus may also be conveniently performed.

In an embodiment, the height of the battery is c, where 3c≤b≤7c is satisfied. The ratio of the width to the height of the battery is larger, and in this way, under the condition that sufficient energy density is ensured, formation maybe conveniently performed.

Optionally, the length of the battery may be 800 mm to 1800 mm, the width of the battery may be 80 mm to 180 mm, and the height of the battery may be 15 mm to 35 mm.

It should be noted that the length of the battery is the dimension in the length direction of the battery, the width of the battery is the dimension in the width direction of the battery, and the height of the battery is the dimension in the height direction of the battery, that is, the thickness of the battery.

In an embodiment, the battery is a laminated battery, which may be conveniently assembled and may further be processed to obtain a battery with a longer length.

The battery includes a cell and an electrolyte, and the battery is the smallest unit capable of performing electrochemical reactions such as charging/discharging. The cell refers to a unit formed by winding or laminating a stacked portion, and the stacked portion includes a first electrode piece, a separator, and a second electrode piece. When the first electrode piece is a positive electrode piece, the second electrode piece is a negative electrode piece. The polarities of the first electrode piece and the second electrode piece may be interchanged.

To be specific, the cell 20 is a laminated cell. The cell 20 has first electrode pieces that are stacked on each other, second electrode pieces whose electrical properties are opposite to the first electrode pieces, and diaphragm pieces disposed between the first electrode pieces and the second electrode pieces. Therefore, multiple pairs of the first electrode pieces and the second electrode pieces are stacked to form the laminated cell.

Optionally, the battery may be a roll core. That is, the first electrode pieces, the second electrode pieces whose electrical properties are opposite to the first electrode pieces, and the diaphragm pieces disposed between the first electrode pieces and the second electrode pieces are wound to obtain a roll core.

An embodiment of the disclosure further provides a battery apparatus, and the battery apparatus includes the abovementioned battery.

The battery of the battery apparatus provided by an embodiment of the disclosure includes the battery casing 10, the cell 20, the first insulating film 30, and the second insulating film 40. The first insulating film 30 covers at least a portion of the cell body 21, and the second insulating film 40 is connected to the first insulating film 30 and covers the tab portions 22, such that the cell 20 and the battery casing 10 are insulated with the first insulating film 30 and the second insulating film 40. Since the second insulating film 40 is independent from the first insulating film 30, the first insulating film 30 and the second insulating film 40 may be conveniently installed, and the assembly efficiency of the battery is thereby improved. Further, by connecting the second insulating film 40 to the first insulating film 30, the installation stability of the first insulating film 30 and the second insulating film 40 may be ensured. Therefore, it is ensured that the first insulating film 30 and the second insulating film 40 realize reliable insulation of the cell 20 and the battery casing 10, and the safety performance of the battery apparatus is thereby improved.

In an embodiment, the battery apparatus is a battery module or a battery pack.

The battery module includes a plurality of batteries, and the battery module may further include end plates and side plates. The end plates and the side plates are configured to secure a plurality of batteries.

It is noted that a plurality of batteries may be formed into a battery module and then may be arranged in a battery box, and the plurality of batteries may be secured by the end plates and the side plates. The plurality of batteries may be directly disposed in the battery box, that is, the plurality of batteries are not required to be arranged into groups, and the end plates and the side plates may then be removed.

Figure 11:
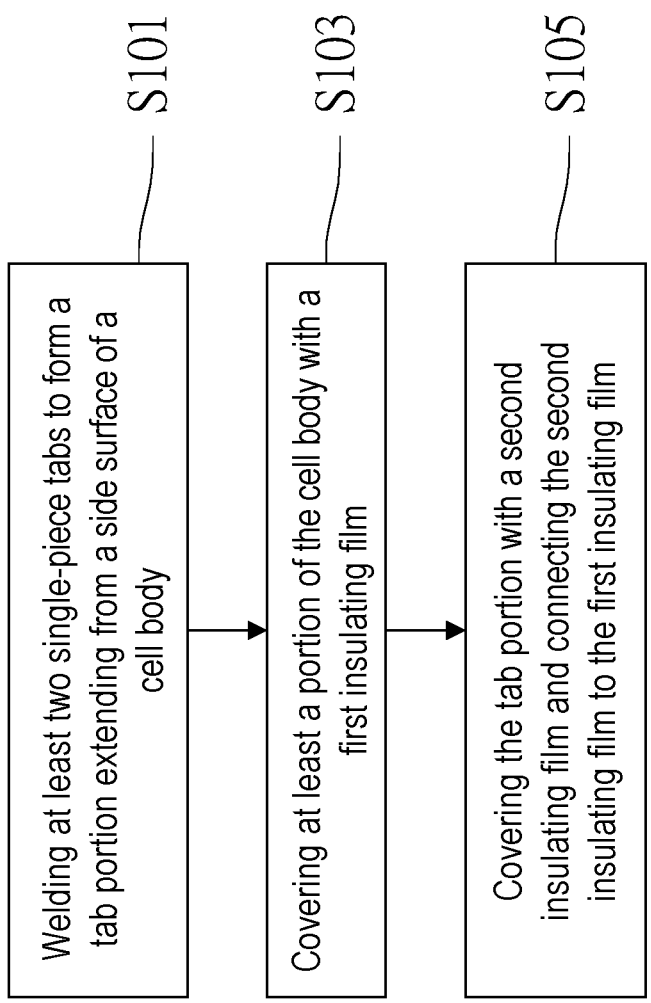
FIG. 11 is a schematic flow chart of a battery manufacturing method according to an exemplary embodiment.

An embodiment of the disclosure further provides a battery manufacturing method, and with reference to FIG. 11, the battery manufacturing method includes the following steps.

In step S101, welding at least two single-piece tabs to form a tab portion 22 extending from a side surface of the cell body 21.

In step S103, covering at least a portion of the cell body 21 with the first insulating film 30.

In step S105, covering the tab portions 22 with the second insulating film 40, and connecting the second insulating film 40 to the first insulating film 30. Such that, the second insulating film 40 covers the upper surface of the first insulating film 30, and the first insulating film 30 is located between the cell body 21 and the second insulating film 40.

In the battery manufacturing method provided by an embodiment of the disclosure, by arranging the first insulating film 30 to cover at least a portion of the cell body 21, by arranging the second insulating film 40 to cover the tab portions 22, and by connecting the second insulating film 40 to the first insulating film 30, the installation stability of the first insulating film 30 and the second insulating film 40 may be ensured. Therefore, it is ensured that the first insulating film 30 and the second insulating film 40 realize reliable insulation of the cell 20 and the battery casing 10, and the safety performance of the battery is thereby improved.

In an embodiment, after the tab portions 22 respectively extending from the side surfaces of the cell body 21 are welded, the tab portions 22 are covered with the second insulating film 40, and the second insulating film 40 is connected to the first insulating film 30. Therefore, the second insulating film 40 may encapsulate the metal chips generated by the welding and bending of the tab portions 22, that the electrical connection of the battery is prevented from being affected by the metal chips, and the safety performance of the battery is thereby improved.

In an embodiment, after a portion of the cell body 21 is covered with the first insulating film 30, each tab portion 22 extending from the side surface of the cell body 21 is welded, and the tab portion 22 may be formed by a plurality of single-piece tabs.

The welding of the tab portion 22 may be by welding a plurality of single-piece tabs, or by welding the tab portion 22 and the connecting sheet 60.

In an embodiment, the second insulating film 40 extends from one of the tab portions 22 and is then bonded to the first insulating film 30, so that the installation efficiency of the second insulating film 40 may be improved, and the installation steps of the second insulating film 40 may thus be simplified.

Since the second insulating film 40 extends from one of the tab portions 22 and is then bonded to the first insulating film 30, it may be considered that the first segment 41 and the second segments 42 form an integrally formed structure, so that the second insulating film 40 may cover both the tab portions 22 and the first insulating film 30, thereby improving the installation efficiency of the second insulating film 40.

In an embodiment, the second insulating film 40 extends from one of the tab portions 22 and is bonded to the other one of the tab portions 22. Therefore, the assembly efficiency of the second insulating film 40 may be improved, the second insulating film 40 may reliably secure the first insulating film 30, and furthermore, the second insulating film 40 may form reliable insulation protection for the two tab portions 22. The second insulating film 40 has an integrally formed structure, so that the second insulating film 40 may be conveniently arranged.

In an embodiment, the second insulating film 40 includes the first segment 41 and the second segments 42 that are independently arranged, and the first segment 41 and the second segments 42 are sequentially formed. For instance, the first segment 41 is bonded to the first insulating film 30, the second segments 42 are respectively bonded to the tab portions 22, and the second segments 42 are connected to the first segment 41.

In an embodiment, the battery manufacturing method further includes the following step. Before at least a portion of the cell body 21 is covered with the first insulating film 30, the corner regions of the cell body 21 are respectively covered with the third insulating films 50. The first insulating film 30 covers the third insulating films 50. Therefore, the first insulating film 30 may secure the third insulating films 50, so as to ensure that the third insulating films 50 may respectively and reliably protect the corner regions of the cell body 21.

In an embodiment, the battery manufacturing method further includes the following step. The terminal components 70 and the connecting sheets 60 are welded.

In one embodiment, the battery manufacturing method is used to form the battery described above.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
   a battery casing;
   a cell, disposed in the battery casing and including a cell body and a tab portion, wherein the tab portion extends from a side surface of the cell body;
   a first insulating film, covering at least a portion of the cell body; and
   a second insulating film, independent from the first insulating film, wherein the second insulating film covers an upper surface of the first insulating film and covers at least a portion of the tab portion, and the first insulating film is located between the cell body and the second insulating film,
   wherein the first insulating film comprises a first end and a second end opposite to each other, and the second insulating film is connected to the first end and the second end,
   wherein the second insulating film comprises a first segment and a second segment, the first segment is connected to the first end and the second end, and the second segment is connected to the first segment and covers the tab portion,
   wherein the second segment further covers a surface of the cell body that is not covered by the first insulating film and the first segment,
   wherein the cell body comprises two first surfaces opposite to each other and four second surfaces surrounding the first surfaces, and an area of each of the first surfaces is greater than an area of each of the second surfaces,
   wherein the first insulating film, the first segment, and the second segment cover a same one of the first surfaces.

2. The battery according to claim 1, wherein the second insulating film is partially adhered to a surface of the first insulating film away from the cell body, and is partially adhered to a surface of the cell body that is not covered by the first insulating film.

3. The battery according to claim 1, wherein a gap is formed between the first end and the second end to expose a portion of the cell body, and the second insulating film covers the gap.

4. The battery according to claim 1, wherein the second segment and the first segment are integrally formed.

5. The battery according to claim 4, wherein in a length direction of the cell body, the first segment extends from one end of the first insulating film to another end of the first insulating film.

6. The battery according to claim 1, wherein the battery further comprises third insulating films, and each of the third insulating films covers one of the first surfaces and adjacent two of the second surfaces.

7. The battery according to claim 6, wherein the first insulating film covers a portion of each of the third insulating films, and the second insulating film is adhered to a surface of the first insulating film covering the first surface.

8. The battery according to claim 1, wherein the second insulating film is provided with an adhesive layer, and the second insulating film is bonded to the first insulating film.

9. The battery according to claim 8, wherein the first insulating film is not provided with an adhesive layer.

10. The battery according to claim 1, wherein a width of the second insulating film is greater than a width of the tab portion, and the width of the second insulating film is less than a width of the cell body.

11. The battery according to claim 1, wherein two tab portions are provided, and the two tab portions respectively extend from two opposite sides of the cell body,
   wherein the second insulating film extends from one of the tab portions to the other one of the tab portions.

* * * * *